(12) United States Patent
Spratling

(10) Patent No.: US 6,692,612 B1
(45) Date of Patent: Feb. 17, 2004

(54) ADHESIVE REMOVAL COMPOSITIONS AND METHODS OF USING SAME

(76) Inventor: Michael Spratling, 27 Ann Rd., SE., Cartersville, GA (US) 30121

( * ) Notice: Subject to any disclaimer, the term of this patent is extended or adjusted under 35 U.S.C. 154(b) by 0 days.

(21) Appl. No.: 09/548,163

(22) Filed: Apr. 13, 2000

Related U.S. Application Data

(60) Provisional application No. 60/129,640, filed on Apr. 16, 1999.

(51) Int. Cl.[7] ............................................... B32B 35/00
(52) U.S. Cl. ......................................... 156/344; 134/42
(58) Field of Search ............................. 134/29, 38, 40, 134/42; 156/344

(56) References Cited

U.S. PATENT DOCUMENTS

| | | | |
|---|---|---|---|
| 3,998,654 A | * 12/1976 | Falaas et al. .................. 134/4 |
| 4,370,174 A | 1/1983 | Braithwaite, Jr. | |
| 4,533,118 A | 8/1985 | Thomas et al. | |
| 4,560,146 A | 12/1985 | Thomas et al. | |
| 4,592,787 A | 6/1986 | Johnson | |
| 4,683,657 A | 8/1987 | Anderson et al. | |
| 4,904,329 A | 2/1990 | Hein et al. | |
| 5,254,290 A | 10/1993 | Blandiaux et al. | |
| 5,464,553 A | 11/1995 | Winston et al. | |
| 5,510,051 A | 4/1996 | Lam | |
| 5,767,049 A | * 6/1998 | Gaul .......................... 510/200 |
| 5,772,284 A | 6/1998 | Lindsey et al. | |

FOREIGN PATENT DOCUMENTS

| | | | |
|---|---|---|---|
| JP | 02274800 A | 4/1989 | |
| WO | 0 346 643 | 5/1989 | |
| WO | WO 98/55567 | 6/1998 | |

OTHER PUBLICATIONS

The Condensed Chemical Dictionary, Van Nostrand Reinhold Company, Inc. 1981, pp. 1095.*

"Adhesives Age", *Tile Adhesive Removers*, Oct. 1989, vol. 32, No. 11, p. 14.

* cited by examiner

Primary Examiner—Richard Crispino
Assistant Examiner—Sing P Chan
(74) Attorney, Agent, or Firm—Kilpatrick Stockton, LLP

(57) ABSTRACT

Novel compositions and methods of using the same which are highly effective at removing adhesive materials. The compositions are useful for removing adhesives, such as those used to secure floor coverings, to thereby aid in the removal of the floor covering. Additionally, the present invention is also directed to methods of removing adhesives and floor coverings using the compositions of the present invention. The present invention uses compositions comprising an alkaline amine reagent, preferably an alkaline aliphatic amine reagent, either alone or coupled with a non-ionic wetting agent. These compositions may be applied to an adhesive. The compositions break down the adhesive, thereby allowing it to be easily removed. Alternatively, to remove a floor covering such as carpet or tile, the composition may be applied directly to the floor covering such that it penetrates the floor covering and contacts the adhesive to break-down the adhesive and permit the easy removal of the floor covering.

6 Claims, No Drawings

ADHESIVE REMOVAL COMPOSITIONS AND METHODS OF USING SAME

CROSS-REFERENCE TO RELATED APPLICATION

This application claims priority to U.S. Provisional Patent Application Serial No. 60/129,640, filed Apr. 16, 1999.

FIELD OF THE INVENTION

The present invention is directed to novel compositions and methods of using the same. In particular, the present invention is directed to compositions which are highly effective at removing adhesive materials. More particularly, the present invention is directed to compositions which are able to remove adhesives, such as those used to secure floor coverings, to thereby aid in the removal of the floor covering. Additionally, the present invention is directed to methods of removing adhesives and floor coverings using the compositions of the present invention.

BACKGROUND OF THE INVENTION

In almost every home and commercial environment, the floors of these environments have some type of covering. These coverings may include wall coverings, such as wall paper or tile, and floor coverings, such as carpeting or tile. These floor coverings may include commercial and residential carpeting, carpet tiles, sheet vinyl and vinyl composition tiles (VCTs).

In most instances, these floor coverings are attached in some manner to the underlying surface. While tacks are sometimes used for carpet in a home environment, almost all other floor coverings, including tile and carpet in a work environment, are attached through the use of adhesive materials, such as permanent, semi-permanent and pressure-sensitive adhesives. Most of these adhesives, especially those used in office environments, are industrial strength and are designed to securely hold the floor covering in place. Should the adhesive not be strong enough, the carpet or tile may break loose, potentially causing injury to an individual.

However, over time, the floor covering will usually need to be replaced due to wear-and-tear, discoloration, or a general desire for something new. Due to the strength of the adhesives, however, it has been very difficult to remove these floor coverings once the adhesive has set. It is almost impossible to remove these floor coverings by hand. Therefore, mechanical systems have been developed to remove these coverings.

Most of the present systems used to remove floor coverings use highly aggressive machines which physically rip the floor covering from the floor. These systems are very labor intensive and usually require that the floor covering be cut into segments using a cutting device and then a machine is brought in to physically remove the cut segments. However, even if the system is able to remove the floor covering, the system leaves a hardened adhesive residue which has not been removed. This residue further complicates the laying of another floor covering since the residue leaves an uneven surface and requires additional adhesive to be used to effectively secure the next floor covering to be attached.

Some chemical systems have been proposed to remove the residual adhesive left after the floor covering has been removed. However, these systems use chemicals which are flammable, pungent, expensive, and, in some instances, include highly volatile organic compounds and/or chlorinated solvents. Therefore, these chemicals are dangerous to work with and are not environmentally friendly.

Accordingly, there is need to provide a composition which may be used to remove an adhesive material in a safe and effective manner. Additionally, what is needed is a method of removing an adhesive material, wherein the method uses compositions which are effective at breaking down the adhesive bonds such that the adhesive material may be easily removed. Additionally, what is needed is a method of separating surfaces which have been adhesively attached by applying a composition which breaks down the adhesive bonds to permit the easy separation of one surface from another.

SUMMARY OF THE INVENTION

The present invention is directed to compositions and methods of using the same. These compositions are especially useful in the removal of adhesive materials. Additionally, these compositions may be used to remove materials which have been secured by an adhesive, such as a floor covering to a sub-floor, wall coverings to a wall, or any other material that is attached to a surface using an adhesive material. The compositions of the present invention preferably comprise an alkaline amine reagent coupled with a non-ionic wetting agent. Preferably, the non-ionic wetting agent comprises an alcohol.

The compositions of the present invention have additional utility in a method of removing an adhesive material. The compositions are capable of attacking and wetting the adhesive material, even adhesives which have dried, and breaking down the adhesive bonds such that the attached surfaces may be easily separated.

Additionally, the compositions may also be used in methods to remove floor coverings which have been attached to an underlying surface using an adhesive material. The compositions are applied to the floor covering such that the compositions contacts the adhesive and breaks down the adhesive bonds between the floor covering and the underlying surface. Then, the floor covering is lifted and removed and any residual adhesive material is wiped away.

Accordingly, it is an object of the present invention to provide a composition that is useful at removing an adhesive material.

It is another object of the present invention to provide a composition that is useful at removing a floor covering.

It is still another object of the present invention to provide a composition for removing adhesives and floor coverings which do not include harmful materials such as high VOCs, aromatics, ketones, acetates or chlorinated solvents.

It is still another object of the present invention to provide a method of removing an adhesive in a safe and easy manner.

It is still another object of the present invention to provide a method of removing a floor covering in a safe and easy manner.

These and other objects, features and advantages of the present invention will become apparent after a review of the following, detailed description of the disclosed embodiments and the appended claims.

DETAILED DESCRIPTION

The present invention is directed to compositions and methods of using these compositions. In particular, the present invention is directed to compositions which are capable of breaking down an adhesive material, thereby permitting the removal of the adhesive material in a very easy manner. Additionally, the present invention is directed to a method of removing a floor covering by applying a composition which breaks down the underlying adhesive, thereby permitting the floor covering to be removed without the need for aggressive floor covering removal machines.

The compositions of the present invention are designed to chemically break down an adhesive material, thereby permitting the easy removal of the adhesive. The compositions contain no high VOCs, aromatics, ketones, acetates or chlorinated solvents and are therefore safe to use. The compositions are also able to attack and remove adhesive compositions which have hardened.

Additionally, the compositions are effective at removing floor coverings or other materials which have been attached using an adhesive material. The compositions break down the adhesive material, thereby allowing the floor covering or other material to be easily removed.

The methods of removing an adhesive material comprise contacting the adhesive material with a composition that is capable of chemically breaking down the adhesive. Once the adhesive has been broken down, it may easily be cleaned away.

The methods of removing a floor covering attached to another surface with an adhesive material comprise contacting the floor covering with an adhesive-removing composition such that the composition contacts the adhesive material. Once contacted, the composition breaks down the adhesive material. Once the adhesive has lost its effectiveness, the floor covering can be easily removed without the need of any aggressive machines.

The compositions of the present invention preferably comprise an alkaline amine reagent, and more preferably an alkaline aliphatic amine reagent, having a desired boiling point and surface tension coupled with a non-ionic wetting agent with similar boiling point and low combined surface tension. The viscosity and surface tension are low enough to assure wetting out and penetration of the adhesive material coupled with a slow evaporation rate to allow enough time for the polar groups of both components to reemulsify, plasticize or otherwise coat the components of the adhesives. When used in conjunction to remove a floor covering, the bond between the floor covering and the sub-flooring is weakened to the extent that the floor covering is easily removed. The hydrophilic parts of the aliphatic amines accept water readily for easy cleanup and the high surface energy of the components permits the composition to readily coat all residual adhesive for easy removal.

As discussed, the compositions of the present invention preferably include an alkaline amine reagent coupled with a non-ionic wetting agent. Alkaline amine reagents useful in the present invention are those that have a high pH, low surface tension and a high boiling point. As discussed, the low surface tension gives the composition the ability to wet and penetrate the adhesive, thereby helping to break down the adhesive bonds. The higher boiling points provide sufficient time to permit the composition to carry out these functions.

Preferably, the components of the present invention have a surface tension of less than about 52 dynes. More desirably, the combined components of the present invention have a surface tension of less than about 30 dynes. Most desirably, combined components of the present invention have a surface tension of less than about 25 dynes. Lower surface tensions are preferred since these components have a higher rate of adhesive penetration. Components having higher surface tensions generally must also have higher boiling points for reasons to be discussed hereafter.

Preferably, the components of the present invention have a boiling point of greater than about 130° C. More preferably, the components of the present invention have a boiling point of greater than about 150° C. Most preferably, components of the present invention have a boiling point of greater than about 160° C. Higher boiling points permit the compositions to react longer with the adhesive. A higher boiling point is generally required with components having a higher surface tension as it takes longer for the component to evaporate, thereby giving the component time to penetrate the adhesive and reemulsify or plasticize the adhesive material.

Examples of preferred alkaline aliphatic amine reagents useful in the present invention include, but are not limited to, diethylamine, dibutyl amine, dipentyl amine, as well as any methyl, ethyl, or propyl amine with an oxygen or hydroxyl attached to the aliphatic part of the chain. However, the preferred alkaline aliphatic amine reagent is ethanolamine. Other alkaline amine reagents useful in the present invention include, but are not limited to, aniline, diphenylamine, and ethylene diamine. These components have higher surface tensions, but they also have higher boiling points, thereby enabling them to have sufficient reaction activity to wet and penetrate the adhesive material. Other alkaline aliphatic amine reagents, such as methyl amine, dimethylamine, ethyl amine, and butyl amine, may be used for adhesives which are already partially wetted. These reagents are effective at wetting and attacking the adhesive material but are generally too volatile to provide the time necessary for penetration and extended time of softening and plasticization of hardened adhesive materials.

The alkaline aliphatic amine is preferably capable of providing an alkalinity level exceeding a pH level of about 10.5 without being reinforced by a residue created by the salt or by-product of an alkali metal, an alkali earth metal, or an ammonium hydroxide or carbonate. While these metallic and ammonium bases may enhance the alkalinity of the system, the residues resulting therefrom are generally not desirable because the residues act as bond-breakers and may adversely affect new materials and/or adhesives that may be applied to the surface at a later time. However, depending upon the particular use of the present invention, it may be possible to use less than about 15% by weight of a metallic or ammonium base without adversely affecting the effectiveness of the system.

In addition to the alkaline aliphatic amine reagent, the compositions of the present invention preferably include a non-ionic wetting agent. However, the compositions of the present invention may comprise only the alkaline aliphatic amine reagent since the non-ionic wetting agent simply enhances the penetration of the amine and the ability of the amine to properly wet a variety of polar as well as non-polar polymers and rubbers. The non-ionic wetting agent is not necessary for the compositions of the present invention to work, but the wetting agent does accelerate the speed by which the amine is able to break down the underlying adhesive.

Preferably, the non-ionic wetting agent comprises an alcohol compound. Examples of alcohols useful in the present invention include, but are not limited to, 1-butyl-2-propanol; 1-ethoxy-2-propanol; 2-(2-ethoxy)-ethanol; 1-ethoxyethanol; 1-propanol; 1-butanol; 1-pentanol; 1-hexanol; 2-ethyl-1-butanol; 2-ethyl-1-hexanol; 2-methyl-1-butanol. However, the preferred alcohol is 2-butoxyethanol. Additionally, phenyl ethanol and 2-amino ethanol may be used, though they have higher surface tensions.

While the compositions of the present invention preferably include alkaline aliphatic amine reagent and an alcohol that both have a low surface tension and a high boiling point, it is possible to combine amines and alcohols that have dissimilar surface tensions and boiling points. If a composition includes one compound having a higher surface tension, the slow wettability and penetration may be partially offset by including a second component that has a low surface tension.

Additionally, it should be recognized that other compounds, which have a molecular configuration similar to either the amine or the alcohol of the preferred embodiment, may not be listed here. However, it is contemplated that these compounds fall within the scope of this invention if it is in the chemical family of the amines and alcohols listed here and/or possess the desired surface tension, alkalinity, viscosity, and boiling point, consequently either singly and/or in combination results in wetting, penetration, softening and/or encapsulating for breaking down adhesives.

The compositions of the present invention have excellent utility in the removal of adhesive materials. The adhesive may be in any form, such as gel, liquid or solid, and may be dry, wet or partially wetted. The compositions are especially effective at removing dried adhesive materials, which, heretofore, could also be removed by vigorous grinding means or by aggressive force applied manually or by machine power to blades directed against the adhesive surface. Additionally, while substantial discussion has been directed towards the removal of adhesives used to secure floor coverings, it is to be recognized that the compositions may be used to remove a wide variety of adhesives.

The types of adhesives which may be removed using the compositions of the present invention include, but are not limited to, rubber cements, mastics, pressure sensitive adhesives, acrylics, vinyl acetates, ethylene vinyl acetates, vinyl acrylics, styrene monomers and copolymers, neoprene latexes, nitrile latexes, SBR, or natural rubber latexes. Two component urethanes and epoxies, and moisture cured urethanes are more difficult to attack and soften. Additionally, adhesives which have been fortified with terpenes, terpene phenolics, rosen esters and other tactifying additives may also be removed.

Additionally, while the compositions of the present invention may be used to remove adhesive materials, they may also aid in the removal of items which are attached to another surface with an adhesive. This is accomplished by applying the composition to the item such that the composition is able to contact the underlying adhesive. Once the composition contacts the adhesive material, it is able to attack the adhesive to break it down, thereby permitting the easy removal of the item. While this process may be used to remove any item attached by an adhesive, it is especially useful for the removal of floor coverings which have been attached to a sub-floor using an adhesive material.

The methods for removal of a floor covering and/or its adhesive from a sub-floor may be used to remove almost any type of floor covering. The floor covering may be commercial or residential carpeting, carpet tiles, sheet vinyl, VCTs, ceramic tiles, porcelain tiles, clay tiles, slate tiles, quarry tiles, marble, travertine, or hardwood flooring.

To remove a floor covering from an underlying surface, such as a sub-floor, the composition of the present invention must be contacted with the underlying adhesive material. For floor coverings that are permeable, it is possible to simply apply the composition, which is usually in an aqueous form, to the surface of the floor covering such that the composition permeates through the floor covering and contacts the adhesive. There, the composition attacks the adhesive material and breaks it down. Once a sufficient period of time has elapsed, the floor covering may be easily removed by simply lifting the now unattached or loosely attached floor covering from the underlying surface.

In those situations where the floor covering is not permeable, the composition is applied such that it contacts the adhesive. This is accomplished by applying the composition to the edge of the floor covering, if possible. Or, slits or breaks may be made in the floor covering such that the composition may seep or be injected through the slits or breaks to contact the adhesive. Once the composition has broken down the adhesive, the floor covering may be easily lifted and any residual adhesive may be wiped away.

It is to be understood that the length of time needed to remove an adhesive material and/or floor covering will vary and depends upon several factors, including the type of adhesive material being removed and its age. Additionally, for the removal of floor coverings, factors include the type of covering, its thickness, and its permeability to the composition. These factors also affect the amount of composition needed to remove an adhesive and any floor covering.

Additionally, one other feature of the present invention is that the composition permits a floor covering to be repaired. Once a composition has been applied to an adhesive material, it will evaporate, thereby permitting the adhesive material to regain its adhesive capabilities. This feature would permit a floor covering which had been removed to either be readjusted or replaced without the need to apply new adhesive.

Accordingly, the compositions of the present invention have the ability to remove adhesive materials, including those which have dried, while also being highly effective at removing materials which have been attached using an adhesive, such as carpet flooring and other floor coverings. The compositions are used in adhesive removal processes which are fast and easy. Additionally, since the compositions do not involve toxic and highly volatile, organic solvents, the compositions are safe to use.

What is claimed is:

1. A method of removing a floor covering which is attached to a surface by an adhesive material, the method comprising:
    applying a composition to the floor covering such that the composition contacts the adhesive material and wets and penetrates the adhesive material to break down adhesive bonds between the floor covering and the surface; and
    lifting the floor covering from the surface;
    wherein the composition comprises an alkaline amine reagent coupled with a non-ionic wetting agent.

2. The method of claim 1, wherein the alkaline amine reagent is selected from diethylamine; dibutyl amine; dipentyl amine; aniline methyl, ethyl, or propyl amine with an oxygen or hydroxyl attached to the aliphatic part of the reagent; aniline; diphenylamine; ethylene diamime; methyl amine; dimethylamine; ethyl amine; butyl amine; or ethanolamine.

3. The method of claim 1, wherein the non-ionic wetting agent is selected from 1-butyl-2-propanol; 1-ethoxy-2-propanol; 2-(2-ethoxy)-ethanol; 1-ethoxyethanol; 1-propanol; 1-butanol; 1-pentanol; 1-hexanol; 2-ethyl-1-butanol; 2-ethyl-1-hexanol; 2-methyl-1-butanol; 2-butoxyethanol; phenyl ethanol; or 2-amino ethanol.

4. The method of claim 1, wherein be alkaline amine reagent comprises ethanolamine and the non-ionic wetting agent comprises 2-butoxyethanol.

5. The method of claim 1, wherein the adhesive material is selected from rubber cements; mastics; pressure sensitive adhesives; acrylics; vinyl acetates; ethylene vinyl acetates; vinyl acrylics; styrene monomers and copolymers; neoprene latexes; nitrile latexes; SBR; natural rubber latexes; two component urethanes and epoxies; or moisture cured urethanes.

6. The method of claim 1, wherein the floor covering is selected from commercial carpeting; residential carpeting; carpet tiles; sheet vinyl; vinyl composition tiles; ceramic tiles; porcelain tiles; clay tiles; slate tiles; quarry tiles; marble; travertine; or hardwood flooring.

* * * * *